(12) United States Patent
Miura

(10) Patent No.: US 6,907,858 B2
(45) Date of Patent: Jun. 21, 2005

(54) ENGINE FUEL INJECTION CONTROL SYSTEM

(75) Inventor: Manabu Miura, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/883,654

(22) Filed: Jul. 6, 2004

(65) Prior Publication Data

US 2005/0022778 A1 Feb. 3, 2005

(30) Foreign Application Priority Data

Jul. 30, 2003 (JP) ....................................... 2003-282975

(51) Int. Cl.$^7$ ................................................. F02B 3/00
(52) U.S. Cl. ....................................... 123/299; 123/344
(58) Field of Search .............................. 123/294, 299, 123/305, 344, 395, 445

(56) References Cited

U.S. PATENT DOCUMENTS 6,412,469 B1 * 7/2002 Itoyama et al. ............. 123/299

FOREIGN PATENT DOCUMENTS

JP    2002-155783 A    5/2002

* cited by examiner

Primary Examiner—Bibhu Mohanty
(74) Attorney, Agent, or Firm—Shinjyu Global IP Counselors, LLP.

(57) ABSTRACT

An engine fuel injection control system is configured to alleviate the torque fluctuation that occurs due to deviation in a pilot injection timing when the excess air ratio is changed suddenly from lean to rich. When the excess air ratio changes by a large amount, the pilot injection interval is changed in accordance with the actual excess air ratio by executing an interpolation calculation based on the target excess air ratio and the actual excess air ratio. During the transient period when the actual excess air ratio is converging toward the target excess air ratio, the pilot injection interval is changed in accordance with the change in the actual excess air ratio. As a result, it is possible to alleviate torque fluctuation by suppressing the tendency of the pilot injection interval to change rapidly in a step-like manner between target values before and after the excess air ratio changes.

13 Claims, 6 Drawing Sheets

ENGINE FUEL INJECTION CONTROL SYSTEM

BACKGROUND OF THE INVENTION

1. Field of the Invention

The present invention generally relates to an engine fuel injection control system. More specifically, the present invention relates to a fuel injection control system configured to execute a pilot injection in advance of a main injection.

2. Background Information

Fuel injection devices equipped with a pilot injection function are a well-known format of fuel injection device for diesel engines, as exemplified in Japanese Laid-Open Patent Publication No. 2002-155783. The pilot injection is a small quantity of fuel that is injected in advance of (prior to) the main injection and serves to reduce the ratio of premixed combustion. The advantage of a pilot injection is that it can improve combustion noise and exhaust emissions performance.

In view of the above, it will be apparent to those skilled in the art from this disclosure that there exists a need for an improved engine fuel injection control system. This invention addresses this need in the art as well as other needs, which will become apparent to those skilled in the art from this disclosure.

SUMMARY OF THE INVENTION

It has been discovered that the optimum fuel injection timing for effectively executing a pilot injection differs depending on the fuel properties and the engine operating state and is particularly strongly influenced by large fluctuations in the excess air ratio. For example, the pilot injection timing changes rapidly during acceleration because the excess air ratio suddenly decreases. Changes in the pilot injection timing generally cause torque fluctuations and when the engine is provided with a common rail fuel injection device, changes in the pilot injection timing combine with fuel pulsations inside the common rail to affect the fuel quantity of the main injection and thereby promote torque fluctuations.

If such torque fluctuation occurs while the vehicle is accelerating, there is little chance that the driver will notice and the operating performance will not be damaged. However, when the engine designed to be controlled to a rich excess air ratio in order to regenerate a NOx trapping catalytic converter and/or an exhaust fine particle filter (DPF), the regeneration control is executed based on a request from the engine, not based on the wishes of the driver, and can therefore be executed under steady state operating conditions as well. When the regeneration control is executed under steady state operating conditions, the torque fluctuation resulting from the change in the pilot fuel injection timing will be readily noticeable to the driver.

In view of the forgoing, an engine fuel injection control system is provided for an engine that basically comprises an excess air ratio control section, a fuel injection timing control section, a pilot injection timing control section and an actual excess air ratio computing section. The excess air ratio control section is configured to control an excess air ratio to a target excess air ratio that is determined based on an engine operating condition of the engine. The pilot injection timing control section is configured to control a pilot injection timing to a target pilot injection timing that is determined based on the engine operating condition. The actual excess air ratio computing section is configured to compute an actual excess air ratio of the engine. The pilot injection timing control section is configured to adjust the pilot injection timing to obtain an adjusted fuel injection timing based on the target excess air ratio and the actual excess air ratio that was computed when an amount of adjustment in the target excess air ratio is larger than a prescribed value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
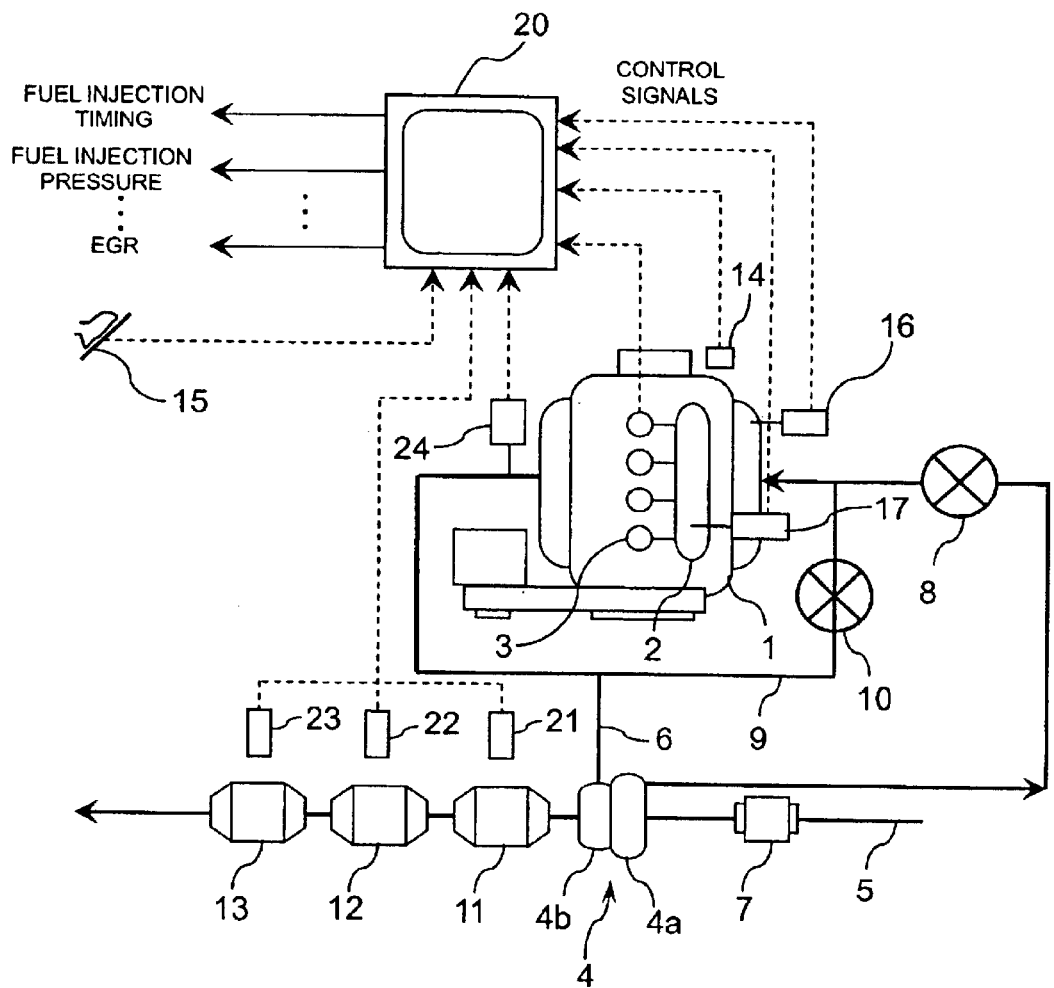
FIG. 1 is a diagrammatic view of an engine fuel injection control system or system for an internal combustion engine, e.g., a diesel engine, in accordance with one embodiment of the present invention.

Referring initially to FIG. 1, an engine fuel injection control system or system is illustrated for an internal combustion engine such as a supercharged diesel engine 1 in accordance with a first embodiment of the present invention. The engine fuel injection control system in accordance with the present invention can be applied to other internal combustion engines used in automobiles and the like.

In the engine fuel injection control system of the present invention, as explained later, when the excess air ratio changes by a large amount, the pilot injection timing is revised so as to change in accordance with the actual excess air ratio by executing an interpolation calculation based on the target excess air ratio and the actual excess air ratio. The term "pilot injection timing" as used herein includes cases in which the pilot injection timing is defined in terms of a pilot injection interval, which is the relative injection timing with respect to the injection timing of the main injection. With the present invention, during the transient period when the actual excess air ratio is converging toward the target excess air ratio, the pilot fuel injection timing is changed in accordance with the change in the actual excess air ratio and can therefore be set appropriately in relation to the actual excess air ratio. As a result, it is possible to alleviate torque fluctuation by suppressing the tendency of the pilot fuel injection timing to change rapidly in a step-like manner between target values before and after the excess air ratio changes.

As shown in to FIG. 1, the engine 1 includes a common rail fuel injection system including a common rail 2, a plurality of fuel injection valves 3, and a high-pressure fuel pump (not shown) so as to be supplied with pressurized fuel. The fuel pump (not shown) pumps fuel to the common rail 2, where the pressurized fuel accumulates, and high-pressure fuel is delivered to the inside of the combustion chambers when the fuel injection valves 3 are opened. Thus, the fuel injection valves 3 inject fuel directly into respective combustion chambers (not shown) of each cylinder.

The fuel injection valves 3 are configured and arranged to execute a pilot injection before the main injection or executing a post-injection following the main injection. By changing the accumulation pressure of the common rail 2, the fuel injection pressure can be controlled in a variable manner.

A turbocharger (supercharger) 4 having a compressor 4a is arranged in an air intake passage 5 of the air intake system. The compressor 4a serves to pressurize the intake air. The compressor 4a is rotated by a turbine 4b that is driven by exhaust gas flowing through an exhaust passage 6. The supercharger 4 is positioned downstream of an air flow meter 7 in the air intake passage 5 of the engine 1. Preferably, the supercharger 4 is a variable-capacity type supercharger having a variable nozzle provided on the turbine 4b. By using a variable-capacity type supercharger 4, the variable nozzle can be constricted when the engine 1 is operating in a low speed region to increase the turbine efficiency. The variable nozzle of the supercharger 4 can be opened when the engine 1 is operating in a high speed region to increase the turbine capacity. Thus, this arrangement enables a high supercharging effect to be obtained over a wide range of operating conditions.

An intake air throttle valve 8 is installed inside the air intake passage 5 at a location downstream of the compressor 4a. The intake air throttle valve 8 serves to make it possible to control the quantity of intake air drawn into the engine 1. The intake air throttle valve 8 is, for example, an electronically controlled throttle valve whose opening degree can be varied freely using a stepper motor.

The exhaust passage 6 is provided with an exhaust gas recirculation (EGR) passage 9 that branches from a position between the engine 1 and the turbine 4b. The EGR passage 9 connects to the air intake passage 5 downstream of the intake air throttle valve 8.

The exhaust system is provided with an exhaust gas recirculation (EGR) control valve 10 that is installed in the EGR passage 9. The EGR valve 10 serves to control the exhaust gas recirculation quantity in accordance with the engine operating conditions. The EGR valve 10 is electronically controlled using a stepper motor such that the opening degree of the EGR valve 10 regulates the flow rate of the exhaust gas recirculated to the air intake system, i.e., the EGR quantity drawn into the engine 1. Preferably, the EGR valve 10 is feedback (closed-loop) controlled to regulate the EGR quantity in such a manner as to achieve an EGR ratio set in accordance with the operating conditions. Basically, the EGR ratio can be feedback controlled by comparing a target intake air quantity to the actual intake air quantity that is measured and outputted by the air flow meter 7.

The exhaust system is also provided with an oxidation catalytic converter 11 having an HC adsorbing function, a NOx trapping catalytic converter 12 having a NOx trapping function, and an exhaust gas fine particle capturing filter (DPF=diesel particulate filter) 13 arranged in sequence in the exhaust passage 6 at a position downstream of the turbine 4b of the turbocharger 4.

The oxidation catalytic converter 11 has the characteristic of adsorbing exhaust HCs when the temperature is low and releasing the HCs when the temperature is high and it functions to oxidize HCs and CO when in an active state. The NOx trapping catalytic converter 12 adsorbs or traps NOx contained in the exhaust gas when the excess air ratio λ is greater than 1, i.e., when the air fuel mixture is lean, and releases the NOx when the excess air ratio λ is rich. The NOx trapping catalytic converter 12 also functions to deoxidize the NOx when in an active state. The particulate filter 13 captures fine particles (PM=particulate matter) contained in the exhaust gas and the captured PM is combusted by raising the exhaust gas temperature using regeneration control.

A control unit 20 is provided to control the exhaust gas cleaning apparatus of the present invention. In particular, the control unit 20 determines and sets the intake air quantity Qa, the fuel injection quantity Qf and the injection timing IT based on detection signals from various sensors (described below) that serve to detect the operating state of the engine 1 and executes the controls based on these signals. Thus, the control unit 20 also controls the drive of the fuel injection valves 3, controls the opening degree of the intake throttle valve 8 and the EGR valve 10 in response to detection signals from various sensors (described below).

The control unit 20 is a microcomputer comprising of a central processing unit (CPU) and other peripheral devices. The control unit 20 can also include other conventional components such as an input interface circuit, an output interface circuit, and storage devices such as a ROM (Read Only Memory) device and a RAM (Random Access Memory) device. The control unit 20 preferably includes an engine control program that controls various components as discussed below. The control unit 20 receives input signals from various sensors (described below) that serve to detect the operating state of the engine 1 and executes the aforementioned controls based on these signals. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The intake air quantity Qa is detected by the air flow meter 7, which outputs a signal to the control unit 20 that is indicative of the intake air quantity Qa. The control unit 20 is also operatively coupled to a rotational speed sensor 14, an accelerator position sensor 15, an engine coolant temperature sensor 16, a rail pressure sensor 17, a plurality of exhaust system temperature sensors 21, 22 and 23, and an exhaust gas sensor or oxygen sensor 24. The rotational speed sensor 14 is configured and arranged to detect the engine rotational speed Ne of the engine 1, and output a signal to the control unit 20 that is indicative of the engine rotational speed Ne of the engine 1. The accelerator position sensor 15 is configured and arranged to detect the accelerator position APO, and output a signal to the control unit 20 that is indicative of the accelerator position APO.

The coolant temperature sensor 16 is configured and arranged to detect the temperature of the engine coolant Tw, and output a signal to the control unit 20 that is indicative of the temperature of the engine coolant Tw. The rail pressure sensor 17 is configured and arranged to detect the fuel pressure (fuel injection pressure) inside the common rail 2, and output a signal to the control unit 20 that is indicative of the fuel pressure (fuel injection pressure) inside the common rail 2. The temperature sensors 21, 22 and 23 are configured and arranged to detect the exhaust gas temperature in the general vicinity of the outlets of the oxidation catalytic converter 11, the NOx trapping catalytic converter 12, and the particulate filter 13, respectively. The temperature sensors 21, 22 and 23 are configured and arranged to output signals to the control unit 20 that are indicative of the exhaust gas temperature in the general vicinity of the outlets of the oxidation catalytic converter 11, the NOx trapping catalytic converter 12, and the particulate filter 13, respectively. The exhaust gas sensor 24 is configured and arranged in the exhaust passage 6 at a position upstream of the turbine 4b to detect the air fuel ratio or the oxygen concentration of the exhaust gas. The exhaust gas sensor 24 is configured and arranged to output a signal to the control unit 20 that is indicative of the air fuel ratio or the oxygen concentration of the exhaust gas.

In relation to the present invention, the control unit 20 carries out the functions of the target excess air ratio control section, the pilot fuel injection timing control section, and the actual excess air ratio computing section.

Accordingly, the control unit 20 controls the regeneration of the NOx trapping catalytic converter 12 and the particulate filter 13. The control unit 20 sets the fuel injection quantity Qf and the fuel injection timing IT based on the detection signals from the various sensors and controls how the fuel injection valves 3 are driven. The control unit 20 also controls the opening degrees of the intake air throttle valve 8 and the EGR valve 10. The control unit 20 also controls the opening degrees of the intake air throttle valve 8 and the EGR valve 10 in accordance with various engine operating conditions. In other words, the control unit 20 controls the fuel injection valves 3 to adjust the fuel injection quantity Qf delivered by the fuel injection valves 3, controls the fuel injection valves 3 to adjust the injection timing IT of the fuel injection valves 3, and controls the intake air throttle valve 8 and the EGR valve 10 to adjust the intake air quantity Qa. The control unit 20 is also operated in accordance with various engine operating conditions (e.g., accelerator position). In relation to the present invention, the control unit 20 carries out the functions of the excess air ratio control section, the pilot injection timing control section, the actual excess air ratio computing section, and the pilot injection timing control section.

Figure 2:
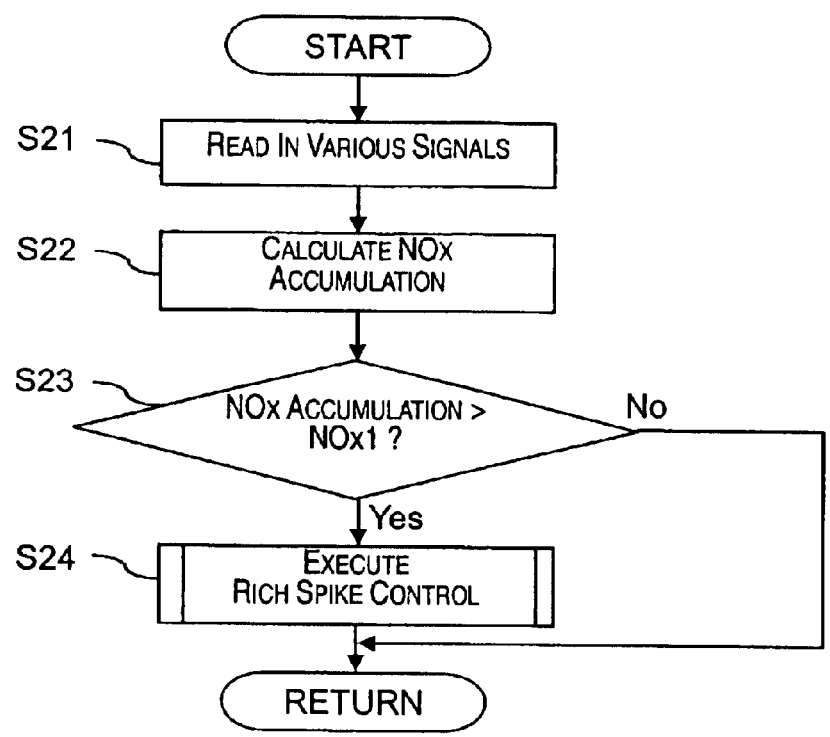
FIG. 2 is a first flowchart showing the control operations executed by the control unit of the engine fuel injection control system or system in accordance with the present invention in order to determine when to regenerate the NOx trapping catalytic converter.
Figure 3:
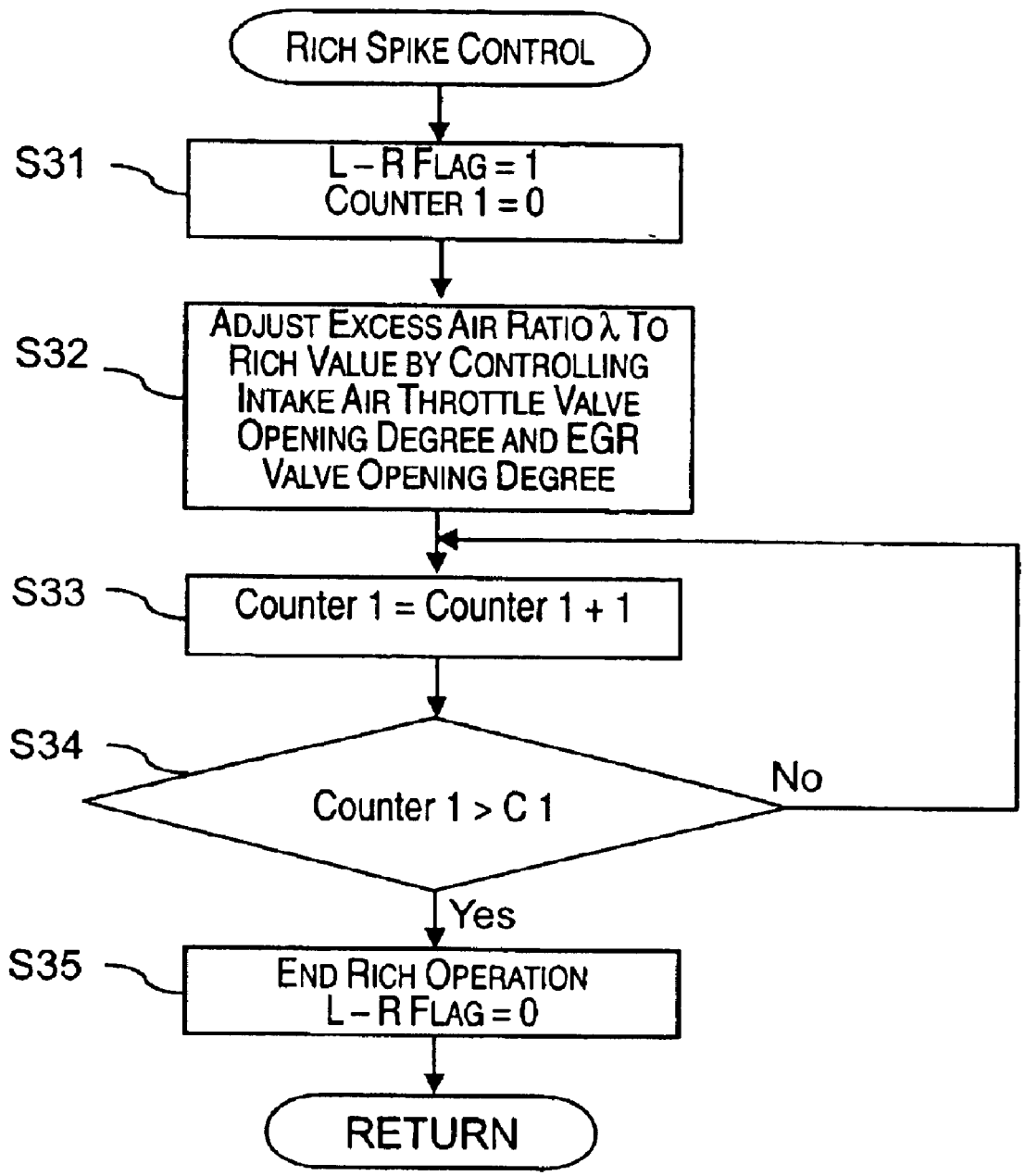
FIG. 3 is a second flowchart showing the control operations of the rich spike control executed by the control unit of the engine fuel injection control system or system in accordance with the present invention in order to regenerate the NOx trapping catalytic converter.
Figure 4:
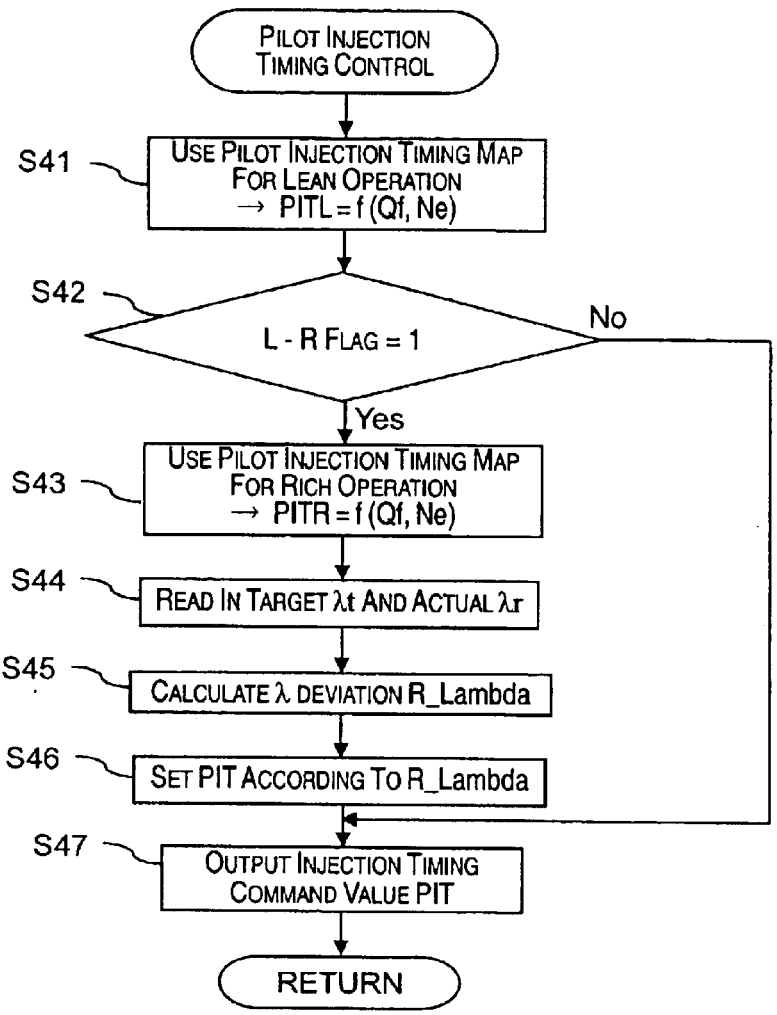
FIG. 4 is a third flowchart showing the control operations of the fuel injection timing adjustment control executed by the control unit of the engine fuel injection control system or system in accordance with the present invention when the excess air ratio is changing rapidly.

As shown in FIGS. 2 to 4, the control routines are shown for the excess air ratio control and the pilot fuel injection timing control to be executed by the control unit 20. In particular, the control unit 20 executes the excess air ratio control as an example of rich spike control, which serves to temporarily shift the excess air ratio to a rich value and thereby desorb and deoxidize the NOx that is adsorbed to the NOx trapping catalytic converter 12 while the engine was operating with lean combustion.

These control routines of FIGS. 2 to 4 are periodically executed in a cyclic manner at a prescribed fixed time interval when the engine 1 is operating in accordance with certain predetermined engine operating conditions, e.g., when the engine 1 is operating in a low-load, low-speed state, including idling. Now, the control routines of FIGS. 2 to 4 will be discussed for the executing the rich spike control and the fuel injection timing control by the control unit 20.

In step S21, the control unit 20 reads in various signals from each of the sensors shown in FIG. 1 that represent engine operating conditions including, but not limited to, the engine rotational speed Ne, the accelerator position APO, the fuel injection quantity, and the engine coolant temperature. In other words, the engine operating state, e.g., load condition and rotational speed condition, of the engine 1 is determined by the control unit 20 receiving signals from each of the sensors shown in FIG. 1.

In step S22, the control unit 20 calculates the amount of NOx accumulated (adsorbed) in the NOx trapping catalytic converter 12 using theses signals from the sensors of FIG. 1. There are various known methods of calculating the NOx accumulation amount. For example, the NOx quantity can be estimated based on signals indicating such operating conditions as the engine rotational speed Ne, the fuel injection quantity Qf, and the coolant temperature Tw and/or the NOx accumulation amount can be calculated by integrating the NOx quantity in accordance with the operation history.

In step S23, the control unit 20 compares the calculated NOx accumulation amount to a reference value NOx1. If the NOx accumulation amount is equal to or less than NOx1, then the control unit 20 ends the current cycle of the routine without performing the rich spike control. If the NOx accumulation amount is greater than NOx1, then the control unit 20 proceeds to step S24 where it executes the rich spike control routine.

FIG. 3 shows the rich spike control routine. In step S31, the control unit 20 sets the L-R flag to 1 to indicate the shift to a rich combustion and initializes the value of Counter1, which is a counter for managing the amount of time over which rich spike control is executed. The initial value of the L-R flag is set to 0.

In step S32, the control unit 20 executes control to reduce the opening degrees of the intake air throttle valve 8 and the EGR valve 10 in order to control the excess air ratio $\lambda$ of the engine 1 to a rich value below the stoichiometric excess air ratio. In some cases, to satisfy the need to achieve the target excess air ratio $\lambda t$, a post injection is executed in order to add fuel during the period between late in the combustion stroke and the exhaust stroke. The NOx that accumulated in the NOx trapping catalytic converter 12 while the engine operated with a lean combustion using a large excess air ratio $\lambda$ is desorbed from the NOx absorbing agent due to the enriched excess air ratio $\lambda$ value resulting from the rich spike control, and the desorbed NOx is cleaned by the deoxidizing treatment that occurs in the catalyst.

In step S33, the control unit 20 increments the value of Counter1, while in step S34 the control unit 20 determines if the resulting value of Counter1 is larger than a reference value C1. The reference value C1 is set based on the NOx accumulation amount computed in the processing routine shown in FIG. 2. The rich spike control continues until the value of Counter1 is greater than the value of C1. When the value of Counter1 is greater than C1, the control unit 20 proceeds to step S35 where it ends the rich operation and resets the value of the L-R flag. Then, the control unit 20 executes such end processing as initializing the NOx accumulation amount and returns to the routine shown in FIG. 2.

The pilot fuel injection timing control will now be described with reference to FIG. 4. First, in step S41, the control unit 20 sets the target pilot injection timing value PITL for lean operation (i.e., normal operation in which the value of the excess air ratio $\lambda$ is not controlled to a rich value, e.g., rich spike control) based on the engine operating state or condition. The target pilot injection timing value PITL is set by, for example, searching a pre-stored map that provides the target pilot injection timing value PITL based on the fuel injection quantity Qf and the engine rotational speed Ne.

Figure 6:
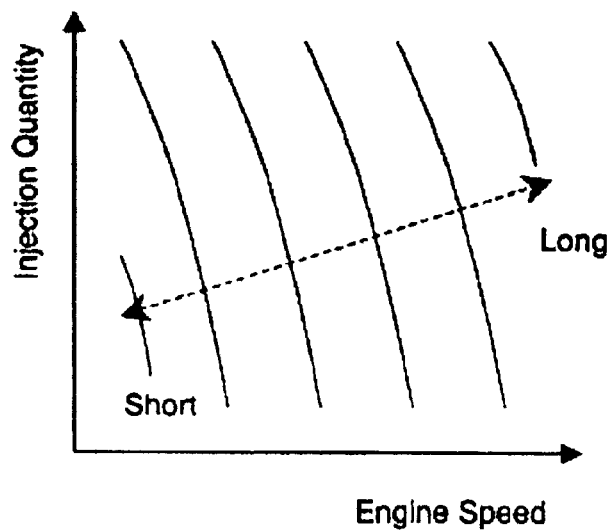
FIG. 6 is a first lean target pilot injection timing map configured to provide a lean target value corresponding to lean operation.

For example, the target pilot injection timing value PITL for lean operation is provided by the injection timing map illustrated in FIG. 6. In particular, the target pilot injection timing map of FIG. 6 is a first lean target pilot injection timing map that is configured to provide a lean target value corresponding to lean operation. The target pilot injection timing value PITL provided by the map of FIG. 6 is given as an absolute crank angle based on a reference crank position signal of a crank angle sensor (in FIG. 1, a rotational speed sensor 14) or a relative crank angle based on the pilot injection interval, i.e., relative to the injection timing of the main fuel injection.

Steps S42 to S47 of the control unit 20 constitutes a part of a pilot injection timing control section that is configured to adjust the pilot injection timing to obtain an adjusted pilot injection timing based on the actual excess air ratio that was computed when an amount of adjustment in the target excess air ratio is larger than a prescribed value. In step S42, the control unit 20 checks the status of the L-R flag to determine if rich spike control is in progress. If the L-R flag is 0, then the engine 1 is in a normal lean operating state and the control unit 20 skips step S43 and proceeds directly to step S47, where it outputs the target pilot injection timing value PITL for lean operation.

Thus, in step S42, the control unit 20 determines if the amount of adjustment in the target excess air ratio is larger than a prescribed value, e.g., a sudden change in the excess air ratio $\lambda$ of approximately 0.8. For example, when the engine enters the rich spike control state, the value of the L-R flag is set to 1, because the excess air ratio $\lambda$ suddenly decreases from a lean value of between 2 and 3, for example, to a rich value of approximately 0.8.

Figure 7:
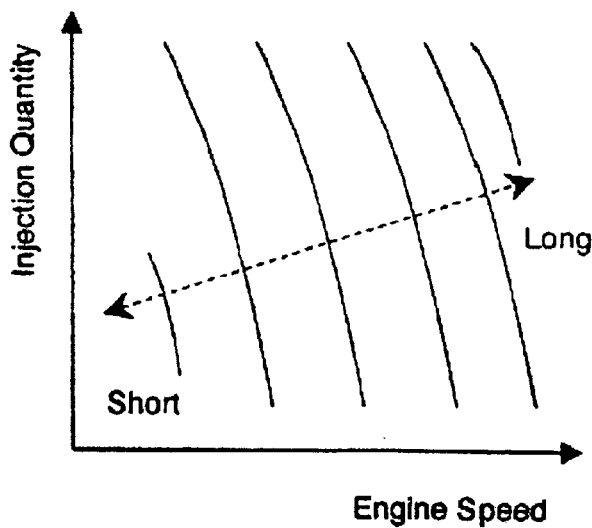
FIG. 7 is a second rich target pilot injection timing map configured to provide a rich target value corresponding to the engine operating condition for rich operation.

In step S43, the control unit 20 sets a target pilot injection timing value PITR for rich operation based on the engine operating state. The target pilot injection timing value PITR for rich operation is set using the map of FIG. 7 in the same manner as when the target pilot injection timing value PITL is set for lean operation. In other words, the injection timing map of the FIG. 7 is a second rich target pilot injection timing map that is configured to provide a rich target value corresponding to the engine operating condition for rich operation. The lean operation and rich operation maps are configured such that, overall, the pilot injection interval is narrower during rich operation than during lean operation in order to improve the ignitability.

Figure 8:
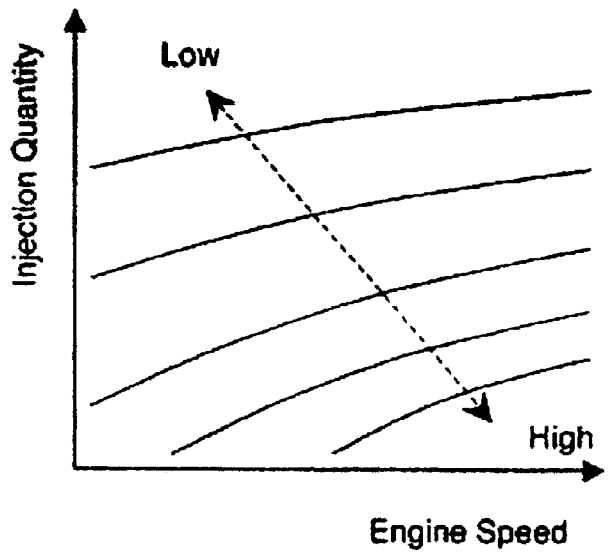
FIG. 8 is a first lean target excess air ratio map configured to provide a lean target value corresponding to the engine operating condition for lean operation.
Figure 9:
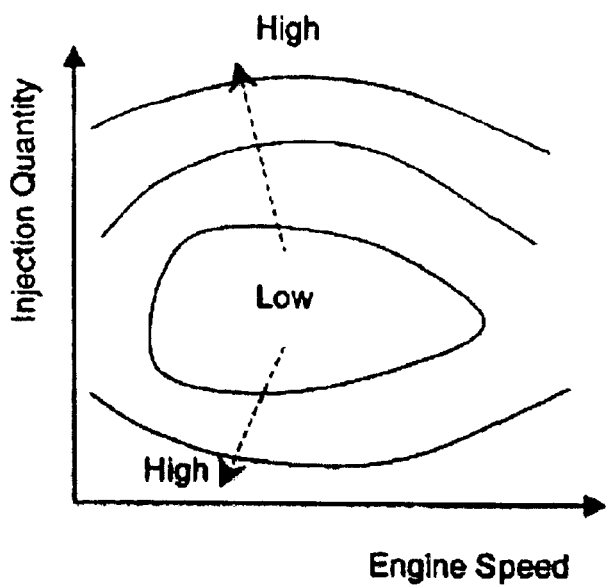
FIG. 9 is a second rich target excess air ratio map configured to provide a rich target value corresponding to the engine operation condition for rich operation.

In step S44, the control unit 20 reads in the current actual excess air ratio $\lambda r$ and the target excess air ratio $\lambda t$ values for both before and after the excess air ratio $\lambda$ changes. In other words, there are two target excess air ratios $\lambda t$ (one for lean operation and one for rich operation) that are used for the excess air ratio control. Thus, each target value is obtained by searching a pre-stored map that gives the target excess air ratios $\lambda t$ based on the engine operating condition or state (similarly to the manner in which the pilot injection timing is found using a map). FIG. 8 illustrates a first lean target excess air ratio map configured to provide a lean target value corresponding to the engine operating condition for lean operation, while FIG. 9 illustrates a second rich target excess air ratio map configured to provide a rich target value corresponding to the engine operation condition for rich operation. The actual excess air ratio $\lambda r$ is either detected using a fuel air ratio sensor 24 or computed based on such factors as the intake air quantity and the fuel injection quantity of the engine 1.

In steps S45 to S46, the control unit 20 finds the excess air ratio deviation R_Lambda based on the rich and lean target excess air ratios $\lambda t$ and the actual excess air ratio $\lambda r$ obtained in step S44 and calculates the pilot injection timing command value PIT using the excess air ratio $\lambda$ deviation R_Lambda and the target pilot injection timings PITL and PITR.

Figure 5:
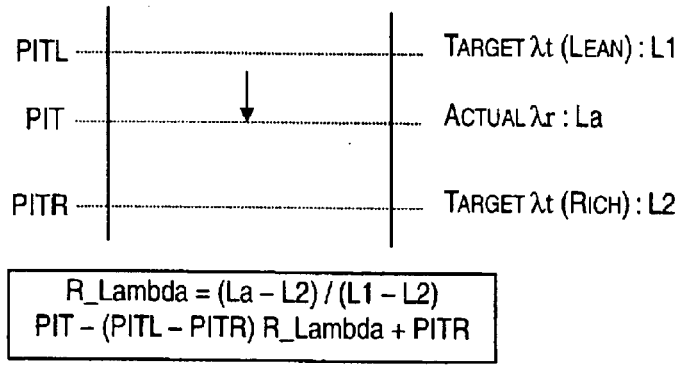
FIG. 5 illustrates a method used by the engine fuel injection control system or system in accordance with the present invention to adjust the pilot injection timing when the excess air ratio is changing rapidly.

An example of a method of calculating the command value PIT will now be described with reference to FIG. 5. First, the excess air ratio deviation R_Lambda is found as a ratio of La with respect to L1 and L2, where the term La is the actual excess air ratio $\lambda r$ and the terms L1 and L2 are the lean target excess air ratio $\lambda t$ and the rich target excess air ratio $\lambda t$, respectively. The command value PIT is found by using this ratio to interpolate between the basic target injection timing value PITL for lean operation and the basic target injection timing value PITR for rich operation. This method is expressed with computational equations as follows.

Excess air ratio $\lambda$ deviation: $R\_Lambda=(La-L2)/(L1-L2)$

Pilot injection timing command value: $PIT=(PITL-PITR)R\_Lambda+PITR$

By revising the fuel injection timing using interpolation, the fuel injection timing command value PIT can be changed according to the change in the actual excess air ratio $\lambda r$ during the period when the actual excess air ratio $\lambda r$ is undergoing a large change from the lean target value to the rich target value. As a result, the pilot injection timing can be set appropriately with respect to the response delay of the actual excess air ratio $\lambda r$ caused by the intake air transport delay that occurs when the target excess air ratio St value changes. Thus, the sudden changes in the pilot injection timing can be suppressed and torque fluctuations can be alleviated.

The embodiments described heretofore are examples of revising the pilot injection timing in accordance with the change in the actual excess air ratio $\lambda r$ that occurs when rich spike control is executed for the purpose of regenerating a NOx trapping catalytic converter. However, the present invention is not limited to such examples and can be applied effectively to basically any situation involving an operating state in which the excess air ratio changes rapidly, e.g., an operating state in which the exhaust gas is controlled to a high temperature in order to regenerate a DPF.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-282975. The entire disclosure of Japanese Patent Application No. 2003-282975 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine fuel injection control system for an engine comprising:

an excess air ratio control section configured to control an excess air ratio to a target excess air ratio that is determined based on an engine operating condition of the engine;

a pilot injection timing control section configured to control a pilot injection timing to a target pilot injection timing that is determined based on the engine operating condition; and an actual excess air ratio computing section configured to compute an actual excess air ratio of the engine, the pilot injection timing control section being configured to adjust the pilot injection timing to obtain an adjusted fuel injection timing based on the target excess air ratio and the actual excess air ratio that was computed when an amount of adjustment in the target excess air ratio is larger than a prescribed value.

2. The engine fuel injection control system as recited in claim 1, wherein the excess air ratio control section is configured to detect a fuel injection quantity and an engine rotational speed as the engine operating condition, and to set the target excess air ratio by using a map configured to provide the target excess air ratio corresponding to the fuel injection quantity and the engine rotational speed that were detected.

3. The engine fuel injection control system as recited in claim 1, wherein the pilot injection timing control section is configured to adjust the pilot injection timing by interpolating in accordance with a ratio of the actual excess air ratio with respect to the target excess air ratio in effect before the adjustment in the target excess air ratio and the target excess air ratio that will take effect after the adjustment in the target excess air ratio.

4. The engine fuel injection control system as recited in claim 1, wherein the pilot injection timing control section is configured to adjust the pilot injection timing when rich spike control is being executed for regenerating a NOx trapping catalytic converter provided in an engine exhaust system.

5. The engine fuel injection control system as recited in claim 1, wherein the pilot injection timing control section is configured to adjust the pilot injection timing when an exhaust gas temperature-increasing control is being executed for the regenerating an exhaust gas particulate filter provided in an engine exhaust system.

6. The engine fuel injection control system as recited in claim 1, wherein the excess air ratio control section is configured to control the excess air ratio by adjusting an opening degree of a throttle valve installed in an air intake passage for adjusting an intake air quantity.

7. The engine fuel injection control system as recited in claim 1, wherein the excess air ratio control section is configured to control the excess air ratio by using a first excess air ratio map configured to provide a lean target value corresponding to the engine operating condition for lean operation, and using a second excess air ratio map configured to provide a rich target value corresponding to the engine operating condition for rich operation.

8. The engine fuel injection control system as recited in claim 1, wherein the pilot injection timing control section is configured to control the pilot injection timing by using a first injection timing map configured to provide a lean target value corresponding to the engine operating condition for lean operation, and using a second injection timing map configured to provide a rich target value corresponding to the engine operating condition for rich operation.

9. The engine fuel injection control system as recited in claim 1, wherein the pilot injection timing control section is configured to set the injection timing and an injection quantity of the fuel according to an injection valve opening timing and an injection valve opening duration.

10. The engine fuel injection control system as recited in claim 3, wherein the excess air ratio control section is configured to control the excess air ratio by using a first excess air ratio map configured to provide a lean target value corresponding to the engine operating condition for lean operation, and using a second excess air ratio map configured to provide a rich target value corresponding to the engine operating condition for rich operation.

11. The engine fuel injection control system as recited in claim 3, wherein the pilot injection timing control section is configured to control the pilot injection timing by using a first injection timing map configured to provide a lean target value corresponding to the engine operating condition for lean operation, and using a second injection timing map configured to provide a rich target value corresponding to the engine operating condition for rich operation.

12. An engine fuel injection control system for an engine comprising:

excess air ratio control means for controlling an excess air ratio to a target excess air ratio that is determined based on an engine operating condition of the engine;

pilot injection timing control means for controlling a pilot injection timing to a target pilot injection timing that is determined based on the engine operating condition; and actual excess air ratio computing means for computing an actual excess air ratio of the engine, the pilot injection timing control means being configured to adjust the pilot injection timing to obtain an adjusted fuel injection timing based on the target excess air ratio and the actual excess air ratio that was computed when an amount of adjustment in the target excess air ratio is larger than a prescribed value.

13. A method for controlling a fuel injection system for an engine comprising:

controlling an excess air ratio to a target excess air ratio that is determined based on an engine operating condition of the engine;

controlling a pilot injection timing to a target pilot injection timing that is determined based on the engine operating condition;

computing an actual excess air ratio of the engine, and adjusting the pilot injection timing to obtain an adjusted fuel injection timing based on the target excess air ratio and the actual excess air ratio that was computed when an amount of adjustment in the target excess air ratio is larger than a prescribed value.

* * * * *